(12) United States Patent
Clein

(10) Patent No.: US 12,151,603 B1
(45) Date of Patent: Nov. 26, 2024

(54) LOAD BINDER APPARATUS

(71) Applicant: Justin Clein, Queensland (AU)

(72) Inventor: Justin Clein, Queensland (AU)

(*) Notice: Subject to any disclaimer, the term of this patent is extended or adjusted under 35 U.S.C. 154(b) by 0 days.

(21) Appl. No.: 18/414,722

(22) Filed: Jan. 17, 2024

(51) Int. Cl.
*B60P 7/08* (2006.01)

(52) U.S. Cl.
CPC .................................. *B60P 7/083* (2013.01)

(58) Field of Classification Search
CPC ................................ B60P 7/083; F16G 11/12
See application file for complete search history.

(56) References Cited

U.S. PATENT DOCUMENTS

| | | | |
|---|---|---|---|
| 3,065,007 | A | 11/1962 | Colmer |
| 6,945,516 | B1 | 9/2005 | Scott et al. |
| 10,308,163 | B2 * | 6/2019 | Helline ................ B60P 7/0853 |
| 10,752,156 | B2 * | 8/2020 | Ruan ...................... B60P 7/083 |
| 11,208,027 | B1 * | 12/2021 | Rainone ................ G01L 5/101 |
| 11,440,458 | B2 * | 9/2022 | Mollick .................. B60P 7/083 |
| 11,447,060 | B2 * | 9/2022 | Wiebe .................. B60P 7/0838 |
| 11,787,328 | B2 * | 10/2023 | Scott ...................... B60P 7/083 410/103 |
| 2019/0351809 | A1 * | 11/2019 | Liu ....................... B60P 7/0823 |
| 2020/0062165 | A1 * | 2/2020 | Wang .................... F16G 11/12 |
| 2020/0164786 | A1 | 5/2020 | Ruan et al. |
| 2022/0389988 | A1 * | 12/2022 | Mollick ................ F16H 31/005 |
| 2023/0114302 | A1 * | 4/2023 | Kreidler ................. B60P 7/083 410/103 |
| 2023/0373379 | A1 * | 11/2023 | Scott ...................... B60P 7/083 |
| 2024/0001837 | A1 * | 1/2024 | Mollick ................. F16G 11/12 |
| 2024/0131979 | A1 * | 4/2024 | Helline ................... B60P 7/083 |

FOREIGN PATENT DOCUMENTS

| | | |
|---|---|---|
| CN | 207712359 U | 8/2018 |
| CN | 215110313 U | 12/2021 |
| FR | 3026804 A1 | 4/2016 |

OTHER PUBLICATIONS

Australian Government, IP Australia, International-type search for provisional patent application, Provisional Application No. 2023902734, dated Oct. 9, 2023.

* cited by examiner

*Primary Examiner* — Robert Sandy
*Assistant Examiner* — Louis A Mercado
(74) *Attorney, Agent, or Firm* — SNELL & WILMER L.L.P.

(57) ABSTRACT

A load binder apparatus includes a housing and a shaft rotatably mounted at least partially in the housing. The shaft has a first gear, a first attachment member coupled with a first end or portion of the shaft and a second attachment member coupled with a second end or portion of the shaft. A second gear is rotatably mounted to the housing and is configured to engage the first gear to rotate the shaft around a first axis to move the first attachment member and the second attachment member in opposing directions along the first axis. A lever is pivotally mounted to the housing and is configured to operate the second gear. The second gear is rotatable about a second axis which is perpendicular to the first axis.

16 Claims, 4 Drawing Sheets

LOAD BINDER APPARATUS

CROSS REFERENCE TO RELATED APPLICATIONS

This application claims priority to and the benefit of Australian Provisional Patent Application No. 2023902734 filed on Aug. 25, 2023 and entitled "Load Binder Apparatus." The contents of which are incorporated by reference in its entirety for all purposes.

FIELD OF THE INVENTION

The present invention relates to load binder apparatus, load binder apparatus kits and associated methods for securing loads.

BACKGROUND

Load binder apparatus, or ratchet load binders, are commonly used to tension chains, cables or the like for applications such as securing loads in place, for example, during transportation, in particular on vehicles and vessels. Very high tensioning forces can typically be achieved, even on short chains or cables. Precise adjustment is achievable by incremental movement of the ratchet lever and such load binders are available in a wide range of sizes and ratings for different applications.

Known ratchet load binder apparatus typically comprise a shaft rotatably mounted in a housing, with a first attachment member coupled with a first end of the shaft and a second attachment member coupled with a second end of the shaft. A chain, cable or the like is typically coupled to each attachment member with a chain link and a hook. The shaft comprises a gear, which is engaged by a ratchet mounted to a lever. When the ratchet engages the gear, rotation of the lever causes the attachment members to move towards each other along an axis of the shaft thus increasing tension in the chains, cables or the like.

One problem with known ratchet load binder apparatus is that the lever is rotated about the same axis of rotation as the shaft, which can cause twisting of the chains, cables or the like. The twisted chains, cables or the like can subsequently untwist, thus reducing tension and causing the load to become unsecured. This is particularly common when loads are secured on vehicles and vessels. Motion of the vehicle or vessel can cause the chains, cables or the like to untwist, resulting in an unsecured load, which can have devastating consequences.

Another problem that exists with known ratchet load binder apparatus is that they have a tendency to lock up in cold environments.

A further problem that exists with known ratchet load binder apparatus is that they can be operated by unauthorised parties, which can lead to theft of the secured load or the load becoming unsecured.

The reference to any prior art in this specification is not, and should not be taken as, an acknowledgement or any form of suggestion that the prior art forms part of the common general knowledge in the art.

OBJECT OF THE INVENTION

It is a preferred object of the present invention to provide a load binder apparatus or the like that addresses or at least ameliorates one or more of the aforementioned problems and/or provides a useful commercial alternative.

SUMMARY OF THE INVENTION

Generally, embodiments of the present invention are directed to a load binder apparatus comprising a pivotally mounted lever which increases and decreases tension exerted by the load binder. The pivotally mounted lever is rotatable about an axis which is perpendicular, or substantially perpendicular to an axis of rotation of a shaft to which attachment members are coupled, thus reducing or avoiding twisting in chains, cables or the like coupled to the attachment members and providing a more safely secured load compared with the prior art.

According to one aspect, but not necessarily the broadest or the only aspect, the present invention is directed to a load binder apparatus comprising:

a housing;

a shaft rotatably mounted at least partially in the housing, the shaft comprising a first gear;

a first attachment member coupled with a first end or portion of the shaft;

a second attachment member coupled with a second end or portion of the shaft;

a second gear rotatably mounted to the housing and configured to engage the first gear to rotate the shaft around a first axis to move the first attachment member and the second attachment member in opposing directions along the first axis; and a lever pivotally mounted to the housing and configured to operate the second gear;

wherein the second gear is rotatable about a second axis which is perpendicular, or substantially perpendicular to the first axis.

Suitably, the lever pivots in a plane parallel to, or substantially parallel to the first axis.

Suitably, the first gear and/or the second gear is a helical gear or a screw gear.

Suitably, the first gear and the shaft are a unitary body.

Suitably, the load binder apparatus further comprises a ratchet mechanism to allow rotation of the second gear in one direction only.

Suitably, the ratchet mechanism comprises a third gear coupled to the second gear, and a pawl member configured to engage the third gear.

Suitably, the pawl member comprises at least two mating members engageable with the third gear to limit rotation of the third gear in a clockwise direction or an anti-clockwise direction.

Suitably, a first portion of the shaft comprises a first thread in a first direction and a second portion of the shaft comprises a second thread in a second direction.

Suitably, the first attachment member and the second attachment member comprise an internal thread to engage the first end of the shaft and the second end of the shaft, respectively.

Suitably, the first attachment member and the second attachment member comprise one or more of the following: a chain link; a lashing hook; a claw hook; a ring; an eyelet; a buckle; a jaw.

Suitably, the load binder apparatus further comprises a locking arrangement to secure the lever in at least one position.

Suitably, the locking arrangement comprises at least one aperture in the housing configured to align with an aperture in the lever to receive a locking device therethrough to secure the lever in position. The locking device may be one of the following: a padlock; a shaft lock pin; a cable; a carabiner; a clip.

Suitably, the at least one aperture is provided in an elongate raised portion of the housing and the lever comprises a channel extending therethrough to receive the elongate raised portion.

According to another aspect, the present invention is directed to a method for securing a load with a load binder apparatus, the method comprising:

attaching a first attachment member of the load binder apparatus to a first attachment point;

attaching a second attachment member of the load binder apparatus to a second attachment point;

wherein the first attachment member is coupled with a first end or portion of a shaft rotatably mounted at least partially in a housing of the load binder apparatus and the second attachment member is coupled with a second end or portion of the shaft, the shaft comprising a first gear and rotatable around a first axis to move the first attachment member and the second attachment member in opposing directions along the first axis; and operating a lever pivotally mounted to the housing to rotate a second gear rotatably mounted to the housing about a second axis which is perpendicular or substantially perpendicular to the first axis, the second gear configured to engage the first gear.

In the method, the load binder apparatus may comprise any one or more of the aforementioned features or any one or more of the features described herein.

According to a further aspect, the present invention is directed to a load binder apparatus kit comprising:

a housing;

a shaft rotatably mountable at least partially in the housing, the shaft comprising a first gear;

a first attachment member couplable with a first end or portion of the shaft;

a second attachment member couplable with a second end or portion of the shaft;

a second gear rotatably mountable to the housing and configured to engage the first gear to rotate the shaft around a first axis to move the first attachment member and the second attachment member in opposing directions along the first axis; and a lever pivotally mountable to the housing and configured to operate the second gear;

wherein, when assembled, the second gear is rotatable about a second axis which is perpendicular or substantially perpendicular to the first axis.

The load binder apparatus kit may comprise any one or more of the aforementioned features or any one or more of the features described herein.

Further features and/or aspects of the present invention will become apparent from the following detailed description.

BRIEF DESCRIPTION OF THE DRAWING

Embodiments of the present invention will now be described with reference to the accompanying drawings, which are provided by way of example only, wherein like reference numerals refer to like features. In the drawings.

Figure 1:
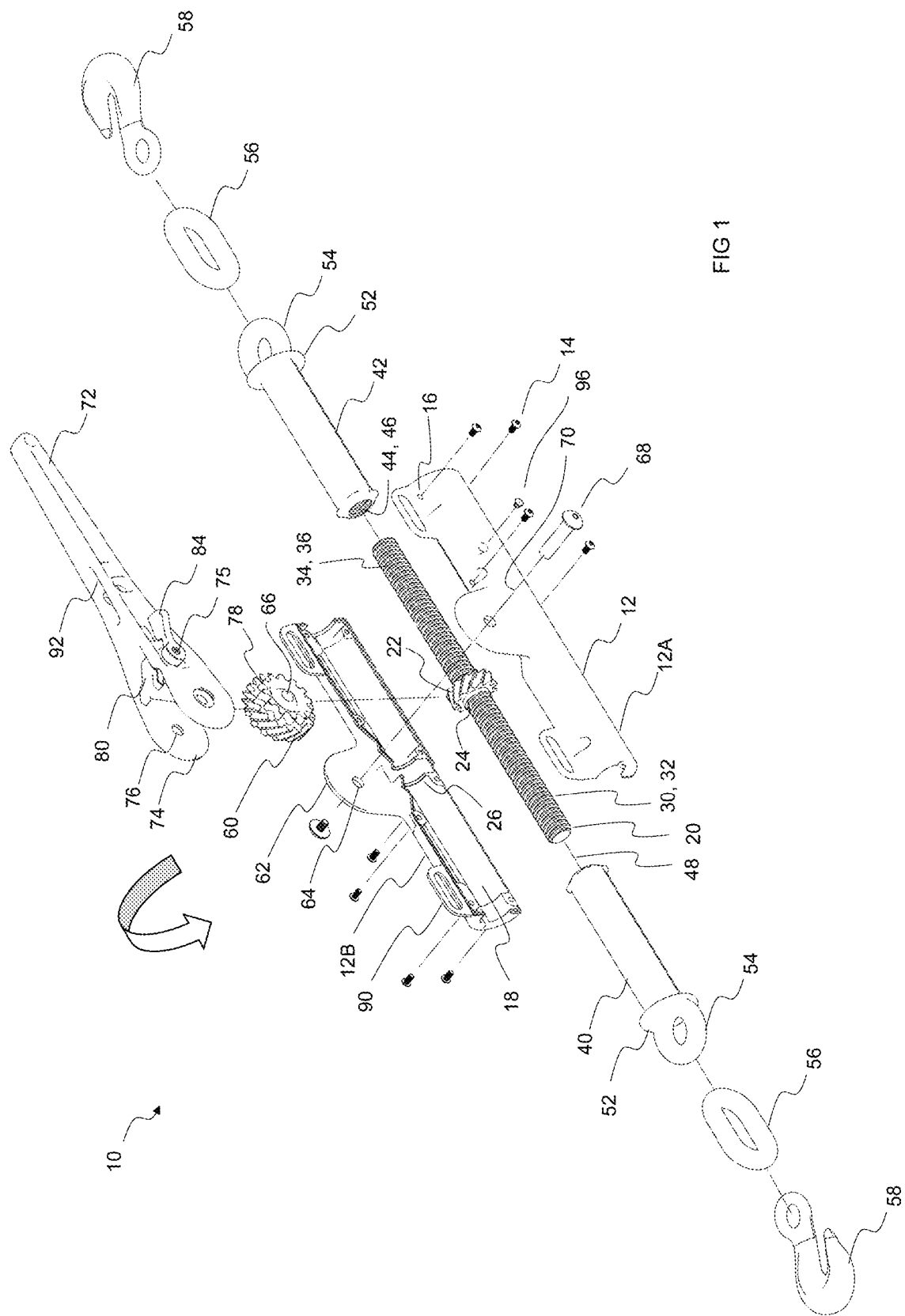
FIG. 1 is an exploded perspective view of a load binder apparatus according to an embodiment of the present invention.
Figure 2:
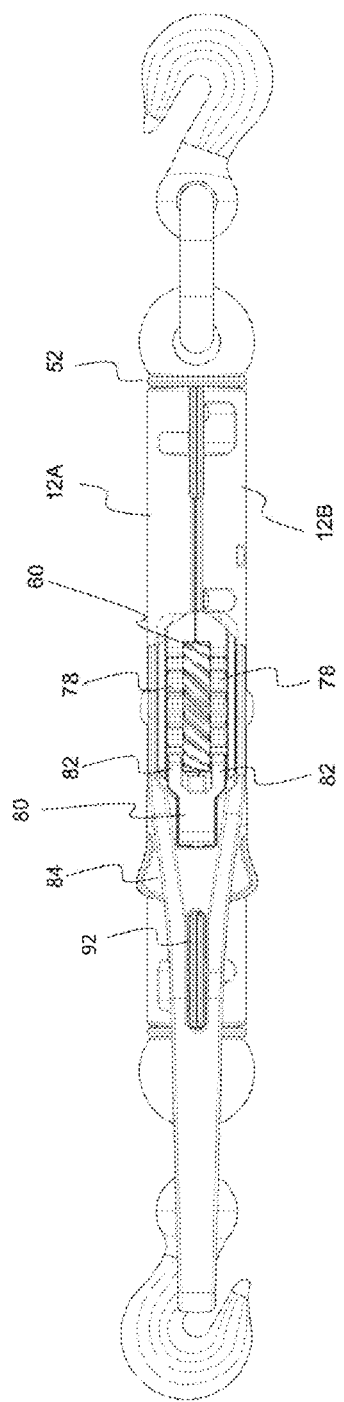
FIG. 2 is a plan view of the load binder apparatus shown in FIG. 1 in an assembled state.
Figure 3:
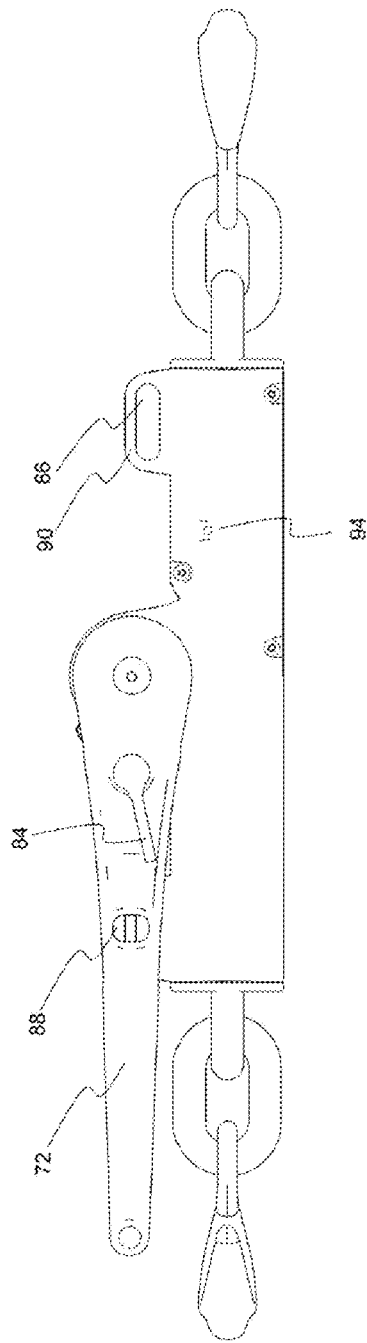
FIG. 3 is a side view of the load binder apparatus shown in FIG. 2.
Figure 4:
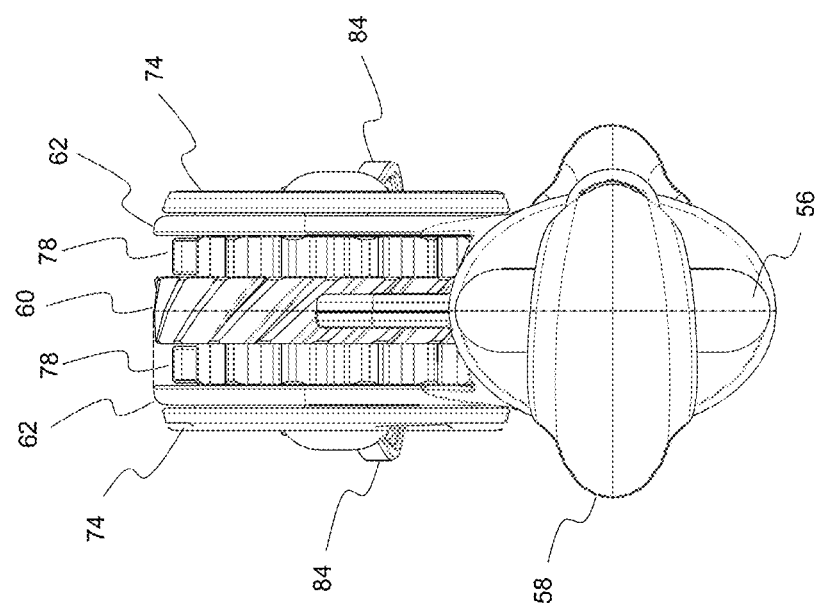
FIG. 4 is an end view of the load binder apparatus shown in FIG. 2.
Figure 5:
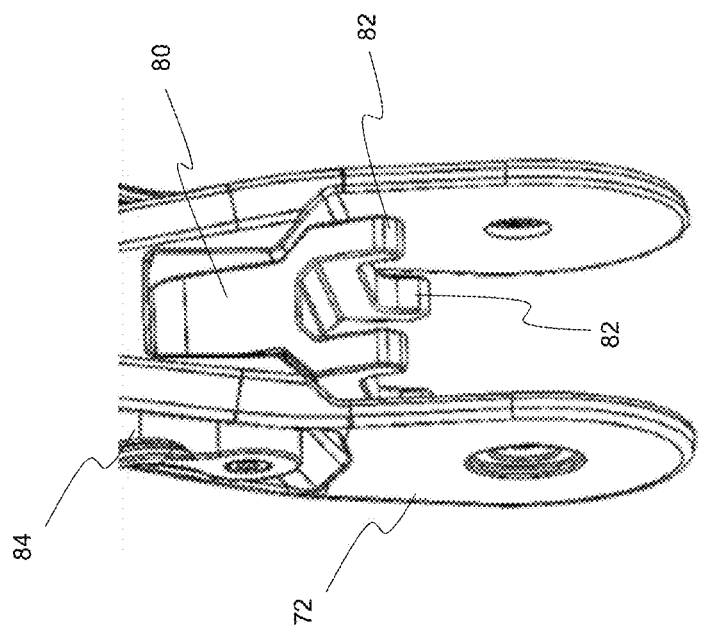
FIG. 5 is an enlarged view of an end portion of a lever of the load binder showing details of a pawl member.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention. Embodiments of the present invention may be represented schematically and/or the drawings may omit one or more features for the sake of clarity.

DETAILED DESCRIPTION

With reference to FIG. 1, a load binder apparatus 10 according to an embodiment of the present invention comprises a housing 12. In the embodiment shown, the housing 12 is formed in two halves 12A, 12B joined together by a plurality of fasteners 14 passed through respective apertures 16 in the housing halves 12A, 12B. In some embodiments, the fasteners are in the form of M4×8 screws, but other fasteners can be used.

The housing 12 has a substantially cylindrical form and comprises an internal cavity 18 to accommodate a shaft 20, which is rotatably mounted at least partially in the housing 12. In the embodiment shown in FIGS. 1-4, the entirety of the shaft 20 is within the housing 12.

The shaft 20 comprises a first gear 22. In the embodiment shown in FIG. 1, the first gear 22 is located centrally along the length of the shaft 20. The first gear 22 can be a helical gear or a screw gear. In preferred embodiments, the first gear 22 and the shaft 20 are a unitary body and can be formed by any suitable means known in the art.

In preferred embodiments, a first portion 30 of the shaft 20 comprises a first thread 32 in a first direction and a second portion 34 of the shaft 20 comprises a second thread 36 in a second direction. For example, the first thread 32 can be a clockwise thread and the second thread 36 can be an anti-clockwise thread or vice versa.

Either side of the first gear 22, is a bearing surface 24, which are rotatably mounted on internal parallel walls 26 of the housing 12. Internal parallel walls 26 are spaced apart by a length or distance corresponding to the separation of the bearing surfaces 24 either side of the first gear 22. Hence, the first gear 22 is also accommodated between the internal parallel walls 26 of the housing 12.

In the embodiment shown in FIGS. 1-4, the load binder apparatus 10 comprises a first attachment member 40 coupled with a first end or the first portion 30 of the shaft 20 and a second attachment member 42 coupled with a second end or the second portion 34 of the shaft 20.

The first attachment member 40 and the second attachment member 42 each have a substantially cylindrical form, and each comprises an internal cavity 44. The first and second attachment members 40, 42 each comprise an internal thread 46 on an inner wall of the internal cavity 44 to engage the first end or first portion 30 of the shaft 20 and the second end or second portion 34 of the shaft 20, respectively. In particular, the internal thread 46 of the first attachment member 40 is complementary to or matching with the first thread 32 of the shaft 20 and the internal thread 46 of the second attachment member 42 is complementary to or matching with the second thread 36 of the shaft 20. Consequently, rotation of the shaft 20 around a first axis 48 moves the first attachment member 40 and the second attachment member 42 in opposing directions along the first axis 48. For example, rotation of the shaft 20 clockwise around the first axis 48 moves the first attachment member 40 and the second attachment member 42 away from each other along the first axis 48 and rotation of the shaft 20 anti-clockwise around the first axis 48 moves the first attachment member 40 and the second attachment member 42 towards each other along the first axis 48, depending on the directions of the threads 32, 36 on the shaft 20.

A distal end of first and second attachment members 40, 42 each comprises a flange or shoulder 52 which abuts an end of the housing 12 when the first and second attachment members 40, 42 are fully retracted and prevents further movement of the first and second attachment members 40, 42 into the housing 12.

According to various embodiments, the first attachment member 40 and the second attachment member 42 comprise one or more of the following: a chain link; a lashing hook; a claw hook; a ring; an eyelet; a buckle; a jaw. In the embodiment shown in FIGS. 1-5, the first and second attachment members 40, 42 each comprise a ring 54 welded to the flange or shoulder 52. A respective chain link 56 is coupled to each ring 54 and a respective lashing hook 58 is coupled to each chain link 54. Although the first and second attachment members 40, 42 each comprise the same combination of ring 54, chain link 56 and lashing hook 56 in the embodiment shown in FIGS. 1-4, this need not be the case.

In the embodiment shown in FIGS. 1-5, the load binder apparatus 10 comprises a second gear 60 rotatably mounted to the housing 12. Each housing half 12A, 12B of the housing 12 comprises a raised portion, extension or protrusion 62 comprising a respective aperture 64 therethrough. Second gear 60 comprises an aperture 66 therethrough and a fastener 68 passes through apertures 64 in the housing halves 12A, 12B and aperture 66 in the second gear 60 to rotatably mount the second gear 60 to the housing 12. In some embodiments, the fastener 68 is in the form of an M6×40 barrel screw set, but other fasteners can be used.

The second gear 60 is configured to engage the first gear 22 to rotate the shaft 20 around a first axis 48 to move the first attachment member 40 and the second attachment member 42 in opposing directions along the first axis 48. In particular, the second gear 60 is mounted to the housing 12 above, and substantially perpendicular to the first gear 22 at a distance sufficient to engage the first gear 22. The second gear 60 is rotatable about a second axis 70 which is substantially perpendicular to the first axis 48. In some embodiments, the second gear 60 is a helical gear or a screw gear depending on the form of the first gear 22.

In the embodiment shown in FIGS. 1-5, the load binder apparatus 10 comprises a lever 72 pivotally mounted to the housing 12 and configured to operate the second gear 60. In particular, lever 72 comprises a pair of arms 74 spaced apart sufficiently to fit outside raised portions, extensions or protrusion 62 of the housing 12. Each arm 74 comprises an aperture 76 to allow the passage therethrough of the fastener 68 to enable pivotal movement of the lever 72 relative to the housing 12. It can be seen that the lever 72 pivots in a plane parallel to, or substantially parallel to the first axis 48. In other words, the lever 72 pivots in line with the first axis 48.

In the embodiment shown in FIGS. 1-5, the load binder apparatus 10 comprises a ratchet mechanism to allow rotation of the second gear 60 in one direction only. In particular, the ratchet mechanism comprises a third gear 78 coupled to the second gear 60, and a pawl member 80 configured to engage the third gear 78. The pawl member 80 comprises at least two mating members 82 engageable with the third gear 78 to limit rotation of the third gear in a clockwise direction or an anti-clockwise direction. The pawl member 80 is pivotally mounted to the lever 72. In particular, the pawl member 80 is pivotally mounted between the spaced apart arms 74 of the lever 72 with at least one fastener 75 passing through apertures (not visible) in the arms 74 and in the pawl member 80. In other embodiments, the pawl member 80 can comprise an indent or recess on both sides thereof to receive an end of a respective fastener 75 on either side.

In the embodiment shown in FIGS. 1-5, a third gear 78 is coupled either side of the second gear 60, and the pawl member 80 comprises an upper pair of mating members 82, which are spaced apart sufficiently to pass either side of second gear 60 to be engageable with the third gear 78. The pawl member 80 also comprises a lower pair of mating members 82, shown in FIG. 5, which are also spaced apart sufficiently to pass either side of second gear 60 to be engageable with the third gear 78.

In the embodiment shown in FIGS. 1-5, the pawl member 80 is controlled with an actuator 84 coupled to the pawl member 80. An actuator 84 is provided on both sides of the lever 72 to enable operation of pawl member 80 irrespective of the side of the load binder apparatus 10 facing the user.

When the pawl member 80 is in a first position as shown in FIGS. 1-4, such that the upper pair of mating members 82 are disengaged from the third gear 78, and the lower pair of mating members 82 are engaged with the third gear 78, rotation of the lever 72 in an anticlockwise direction as indicated by the arrow in FIG. 1 does not cause rotation of the second gear 60.

When the pawl member 80 is still in the first position, rotation of the lever 72 in a clockwise direction back to the original position of the lever 72 causes rotation of the second gear 60, since the lower pair of mating members 82 are engaged with the third gear 78, such that the shaft 20 rotates in an anticlockwise direction and the first attachment member 40 and the second attachment member 42 move towards each other, thus increasing tension in any chains, cables or the like coupled to the first and second attachment members 40, 42. Repeating this anticlockwise and then clockwise motion of the lever 72 in line with the first axis 48 of the shaft 20 further increases tension in the chains, cables or the like coupled to the first and second attachment members 40, 42.

When the pawl member 80 is moved to a second position such that the upper pair of mating members 82 are engaged with the third gear 78, and the lower pair of mating members 82 are disengaged from the third gear 78, rotation of the lever 72 in an anticlockwise direction as indicated by the arrow in FIG. 1 rotates the second gear 60 in an anticlockwise direction causing the first gear 22 and the shaft 20 coupled to the first gear 22 to rotate in a clockwise direction. This causes the first attachment member 40 and the second attachment member 42 to move away from each other along the first axis 48, thus reducing tension in any chains, cables or the like coupled to the first and second attachment members 40, 42. Repeating this anticlockwise and then clockwise motion of the lever 72 in line with the first axis 48 of the shaft 20 whilst the pawl member 80 remains in the second position further reduces tension in the chains, cables or the like coupled to the first and second attachment members 40, 42.

Hence, the ratchet mechanism allows rotation of the second gear 60 in one direction only and the direction depends on whether the upper pair of mating members 82 or the lower pair of mating members 82 of the ratchet mechanism are engaged with the third gear 78.

In the embodiment shown in FIGS. 1-5, the load binder apparatus 10 comprises a locking arrangement to secure the lever 72 in at least one position. In particular, the locking arrangement comprises at least one aperture 86 in the housing 12 configured to align with an aperture 88 in the lever 72 to receive a locking device (not shown) therethrough to secure the lever 72 in position. The locking device can be one of the following: a padlock; a shaft lock pin; a cable; a carabiner; a clip or other locking device.

In the embodiment shown in FIGS. 1-5, the load binder apparatus 10 comprises two apertures 86, one at or towards each end of the housing 12, to enable the lever 72 to be secured in two different positions. The two different positions are when the lever 72 is fully over to one side or the other side and the lever 72 is substantially parallel with the housing 12.

In the embodiment shown in FIGS. 1-5, the at least one aperture 86 is provided in an elongate raised portion 90 in each half 12A, 12B of the housing 12. Lever 72 comprises a channel 92 extending therethrough for receiving the elongate raised portion 90 when the lever 72 is in a locking position.

In some embodiments, the housing 12 comprises a further aperture 94 sealed by a grommet 96. Removal of the grommet 96 allows lubrication to be applied to the shaft 20, shaft threads 32, 36 and consequently the internal cavities 44 and internal threads 46.

According to another aspect, the present invention is directed to a method for securing a load with the load binder apparatus 10. The method comprises attaching the first attachment member 40 of the load binder apparatus 10 to a first attachment point, such as a chain, cable or the like, or a fixed point, such as the structure of a vehicle or vessel and attaching the second attachment member 42 of the load binder apparatus 10 to a second attachment point, such as another chain, cable or the like, or a fixed point, such as the structure of a vehicle or vessel.

As described herein, the first attachment member 40 is coupled with the first end or first portion 30 of the shaft 20 rotatably mounted at least partially in a housing 12 of the load binder apparatus 10 and the second attachment member 42 is coupled with the second end or second portion 34 of the shaft 20.

As described herein, the shaft 20 comprises the first gear 22 and is rotatable around the first axis 48. The second gear 60 is configured to engage the first gear 22 to move the first attachment member 40 and the second attachment member 42 in opposing directions along the first axis 48.

As described herein, the method comprises operating the lever 72 pivotally mounted to the housing 12 to rotate the second gear 60 rotatably mounted to the housing 12 about the second axis 70 which is perpendicular or substantially perpendicular to the first axis 48.

As described herein, depending on whether the upper or lower pair of mating members 82 are engaged with the third gear 78, the first and second attachment members 40, 42 will be moved towards or away from each other to increase or decrease tension in the chains, cables or the like coupled to the load binder apparatus 10.

It is envisaged that the load binder apparatus can be supplied as a kit and assembled by, for example, the end user. Therefore, another aspect of the present invention is a load binder apparatus kit comprising the housing 12 and the shaft 20 rotatably mountable at least partially in the housing 12, the shaft comprising the first gear 22. The load binder apparatus kit comprises the first attachment member 40 couplable with the first end or portion 30 of the shaft 20 and the second attachment member 42 couplable with the second end or portion 34 of the shaft 20. The load binder apparatus kit comprises the second gear 60 rotatably mountable to the housing 20 and configured to engage the first gear 22 to rotate the shaft 20 around the first axis 48 to move the first attachment member 40 and the second attachment member 42 in opposing directions along the first axis 48. The load binder apparatus kit comprises the lever 72 pivotally mountable to the housing 12 and configured to operate the second gear 60. When assembled, the second gear 60 is rotatable about the second axis 70 which is perpendicular or substantially perpendicular to the first axis 48.

Hence, the load binder apparatus 10 according to embodiments of the present invention addresses, or at least ameliorates one or more of the aforementioned problems of the prior art and provides a useful commercial alternative. For example, the pivotally mounted lever 72, which increases and decreases tension exerted by the load binder apparatus 10, is rotatable about an axis 70 which is perpendicular, or substantially perpendicular to an axis of rotation 48 of the shaft 20 to which the attachment members 40, 42 are coupled, thus reducing or avoiding twisting in chains, cables or the like coupled to the attachment members and therefore providing a more safely secured load compared with the prior art.

Another advantage of the load binder apparatus 10 according to embodiments of the present invention is the provision of a locking arrangement to secure the lever 72 in at least one position to prevent tampering with the load binder apparatus by unauthorised persons.

Furthermore, because the load binder apparatus 10 according to embodiments of the present invention avoids the twisting and counter-rotation issues associated with the prior art, the load binder apparatus 10 does not lock up in cold environments.

Any of the features of the load binder apparatus 10 described herein can be combined in any combination with any one or more of the other features described herein within the scope of the invention.

In this specification, adjectives such as first and second, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

In this specification, the terms "comprises", "comprising" or similar terms are intended to mean a non-exclusive inclusion, such that an apparatus that comprises a list of elements does not include those elements solely but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A load binder apparatus comprising:
   a housing;
   a shaft rotatably mounted at least partially in the housing, the shaft comprising a first gear;

a first attachment member coupled with a first end or portion of the shaft;

a second attachment member coupled with a second end or portion of the shaft;

a second gear rotatably mounted to the housing and configured to engage the first gear to rotate the shaft around a first axis to move the first attachment member and the second attachment member in opposing directions along the first axis; and a lever pivotally mounted to the housing and configured to operate the second gear;

wherein the second gear is rotatable about a second axis which is perpendicular, to the first axis;

wherein the first gear and/or the second gear is a helical gear or a screw gear.

2. The load binder apparatus of claim 1, wherein the lever pivots in a plane parallel to, or substantially parallel to the first axis.

3. The load binder apparatus of claim 1, wherein the first gear and the shaft are a unitary body.

4. The load binder apparatus of claim 1, further comprising a ratchet mechanism to allow rotation of the second gear in one direction only.

5. The load binder apparatus of claim 4, wherein the ratchet mechanism comprises a third gear coupled to the second gear, and a pawl member configured to engage the third gear.

6. The load binder apparatus of claim 5, wherein the pawl member comprises at least two mating members engageable with the third gear to limit rotation of the third gear in a clockwise direction or an anti-clockwise direction.

7. The load binder apparatus of claim 1, wherein the first portion of the shaft comprises a first thread in a first direction and the second portion of the shaft comprises a second thread in a second direction.

8. The load binder apparatus of claim 1, wherein the first attachment member and the second attachment member comprise an internal thread to engage the first end of the shaft and the second end of the shaft, respectively.

9. The load binder apparatus of claim 1, wherein the first attachment member and the second attachment member comprise one or more of the following: a chain link; a lashing hook; a claw hook; a ring; an eyelet; a buckle; a jaw.

10. The load binder apparatus of claim 1, further comprising a locking arrangement to secure the lever in at least one position.

11. The load binder apparatus of claim 10, wherein the locking arrangement comprises at least one aperture in the housing configured to align with an aperture in the lever to receive a locking device therethrough to secure the lever in position.

12. The load binder apparatus of claim 11, wherein the at least one aperture is provided in an elongate raised portion of the housing and the lever comprises a channel extending therethrough to receive the elongate raised portion.

13. A method for securing a load with a load binder apparatus, the method comprising:

attaching a first attachment member of the load binder apparatus to a first attachment point;

attaching a second attachment member of the load binder apparatus to a second attachment point;

wherein the first attachment member is coupled with a first end or portion of a shaft rotatably mounted at least partially in a housing of the load binder apparatus and the second attachment member is coupled with a second end or portion of the shaft, the shaft comprising a first gear and rotatable around a first axis to move the first attachment member and the second attachment member in opposing directions along the first axis; and operating a lever pivotally mounted to the housing to rotate a second gear rotatably mounted to the housing about a second axis which is perpendicular to the first axis, the second gear configured to engage the first gear;

wherein the first gear and/or the second gear is a helical gear or a screw gear.

14. The method of claim 13, wherein the load binder apparatus comprises any one or more of the following:

wherein the lever pivots in a plane parallel to, or substantially parallel to the first axis;

wherein the first gear and the shaft are a unitary body;

a ratchet mechanism to allow rotation of the second gear in one direction only;

wherein the ratchet mechanism comprises a third gear coupled to the second gear, and a pawl member configured to engage the third gear;

wherein the pawl member comprises at least two mating members engageable with the third gear to limit rotation of the third gear in a clockwise direction or an anti-clockwise direction;

wherein the first portion of the shaft comprises a first thread in a first direction and the second portion of the shaft comprises a second thread in a second direction;

wherein the first attachment member and the second attachment member comprise an internal thread to engage the first end of the shaft and the second end of the shaft, respectively; wherein the first attachment member and the second attachment member comprise one or more of the following: a chain link; a lashing hook; a claw hook; a ring; an eyelet; a buckle; a jaw;

a locking arrangement to secure the lever in at least one position;

wherein the locking arrangement comprises at least one aperture in the housing configured to align with an aperture in the lever to receive a locking device therethrough to secure the lever in position;

wherein the at least one aperture is provided in an elongate raised portion of the housing and the lever comprises a channel extending therethrough to receive the elongate raised portion.

15. A load binder apparatus kit comprising:

a housing;

a shaft rotatably mountable at least partially in the housing, the shaft comprising a first gear;

a first attachment member couplable with a first end or portion of the shaft;

a second attachment member couplable with a second end or portion of the shaft;

a second gear rotatably mountable to the housing and configured to engage the first gear to rotate the shaft around a first axis to move the first attachment member and the second attachment member in opposing directions along the first axis;

wherein the first gear and/or the second gear is a helical gear or a screw gear; and a lever pivotally mountable to the housing and configured to operate the second gear;

wherein, when assembled, the second gear is rotatable about a second axis which is perpendicular to the first axis.

16. The load binder apparatus kit of claim 15, wherein the load binder apparatus kit comprises any one or more of the following:

wherein the lever pivots in a plane parallel to the first axis;
wherein the first gear and the shaft are a unitary body;
a ratchet mechanism to allow rotation of the second gear in one direction only;
wherein the ratchet mechanism comprises a third gear coupled to the second gear, and a pawl member configured to engage the third gear;
wherein the pawl member comprises at least two mating members engageable with the third gear to limit rotation of the third gear in a clockwise direction or an anti-clockwise direction;
wherein the first portion of the shaft comprises a first thread in a first direction and the second portion of the shaft comprises a second thread in a second direction;
wherein the first attachment member and the second attachment member comprise an internal thread to engage the first end of the shaft and the second end of the shaft, respectively;
wherein the first attachment member and the second attachment member comprise one or more of the following: a chain link; a lashing hook; a claw hook; a ring; an eyelet; a buckle; a jaw;
a locking arrangement to secure the lever in at least one position;
wherein the locking arrangement comprises at least one aperture in the housing configured to align with an aperture in the lever to receive a locking device therethrough to secure the lever in position;
wherein the at least one aperture is provided in an elongate raised portion of the housing and the lever comprises a channel extending therethrough to receive the elongate raised portion.

* * * * *